I. KEYES.
Horse Rake.
No. 1,251.  Patented July 17, 1839.
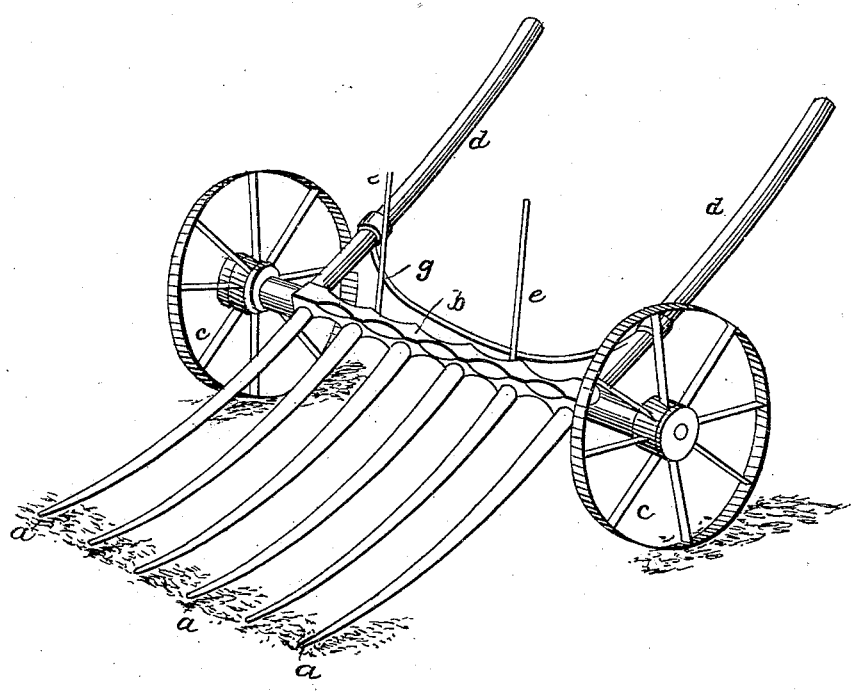
Witnesses.
Elisha H. Allen
J. D. Bradley
Inventor.
Israel Keyes

UNITED STATES PATENT OFFICE.

ISRAEL KEYES, OF PUTNEY, VERMONT.

IMPROVEMENT IN MACHINES FOR BINDING GRAIN.

Specification forming part of Letters Patent No. 1,251, dated July 17, 1839.

*To all whom it may concern:*

Be it known that I, ISRAEL KEYES, of Putney, in the county of Windham and State of Vermont, have invented a new and Improved Grain-Rake; and I do hereby declare that the following is a full and exact description thereof.

The object attempted in my invention is to gather the grain easily and quickly into quantities fit for bundles, and to hold it when thus gathered at a convenient height from the ground until it can be bound, thus relieving the labor by diminishing the necessity for stooping, and preventing, also, the wounding of his hands upon the stubble. To effect these purposes, the grain is gathered by six or seven fingers, somewhat resembling the fingers of a cradle, (see Figure I, $a$,) running beneath the grain, and these fingers are propelled by their butts or rear ends being firmly fixed in an axle-tree, (see $b$, Fig. I,) and this axle-tree is supported by two wheels, (see $c$, Fig. I,) and is pushed along and its fingers guided and directed by means of two handles, (see $d$, Fig. I,) which extend out behind like those of a wheel barrow, and are attached to the axle tree. A convenient mode of attaching these handles to the axle-tree is to use rings and wedges like those which fasten the nib to the scythe snath. This axle-tree has also two uprights or guards, (see $e$, Fig. I,) to prevent the grain falling over when the handles are depressed and the fingers elevated. These uprights I sometimes make in the fashion of staples or bows, standing in the axle-tree one within another, as represented at $f$, Fig. II, each end of the axle-tree being furnished with two, and a space in the middle being left vacant for the hands of the workman while binding the grain.

Attached to the handles, and passing from one handle to the other in a curve with its convexity downward, is a stirrup, of stout wire, (see $g$, Fig. I,) to enable the workman with his foot to hold down the handles, and of course elevate the fingers while the bundle of grain is tied.

It will be found a convenient proportion to make the fingers and the handles each three feet long, the axle-tree four and one-half feet between the wheels, and the wheels two feet in diameter.

While collecting the grain for a bundle, the handles are elevated, and the fingers consequently depressed, so as to pass under and collect the grain. When enough to form a bundle is thus gathered, the handles are depressed, and the fingers with their burden of grain are raised, the workman putting his foot upon the stirrup, and thus holding the grain up till the bundle is tied.

What I claim as my invention, and desire to secure by Letters Patent, is—

1. The method of binding grain by means of a rake, in combination with the uprights or guards, as hereinbefore described.

2. In combination with the above, the stirrup for holding the grain up with the foot while the bundle is bound.

ISRAEL KEYES.

Witnesses:
   J. D. BRADLEY,
   ASA PEELER.